Figure 1:
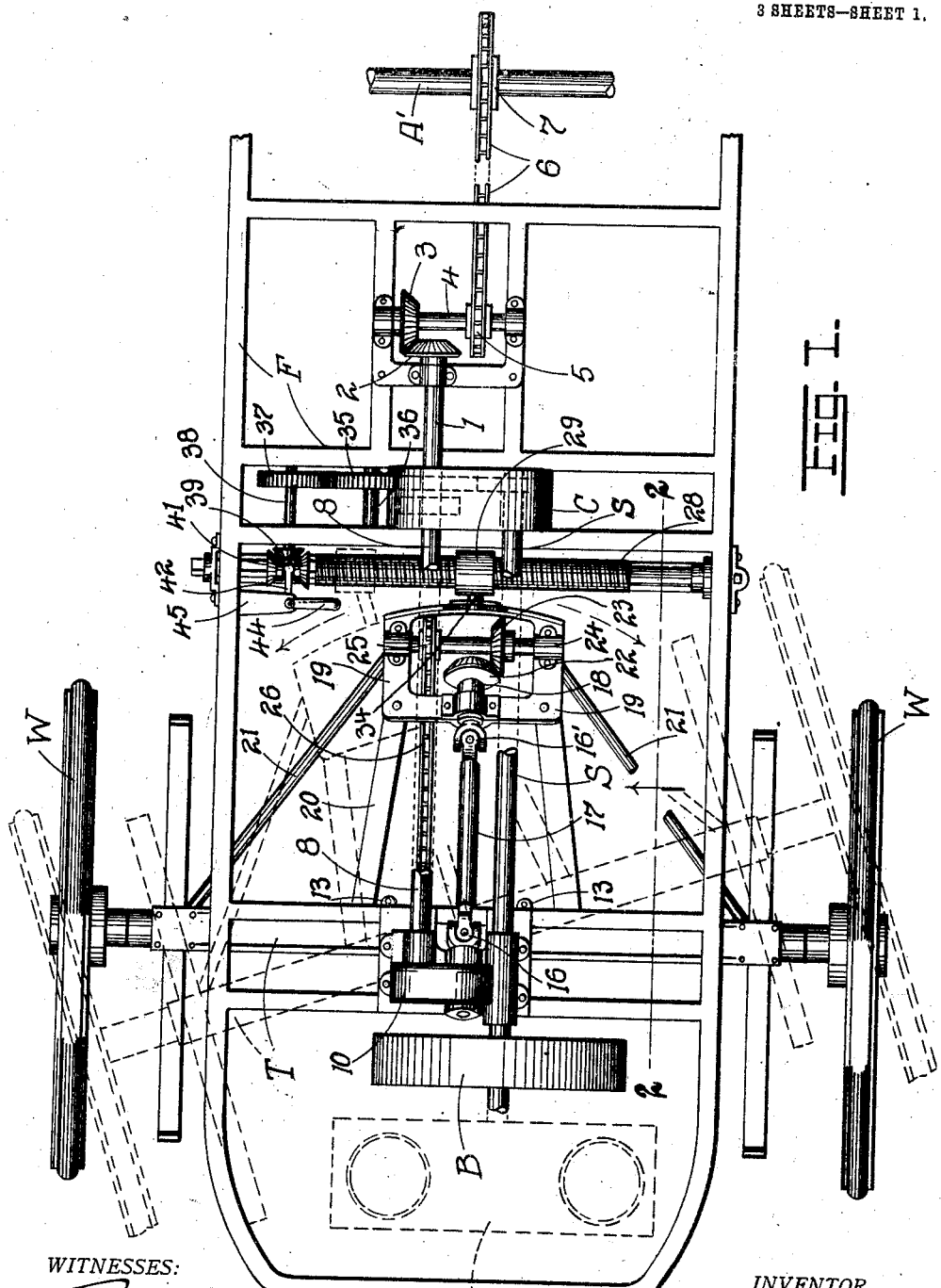

No. 874,709. PATENTED DEC. 24, 1907.
P. STEINHAUER.
STEERING GEAR.
APPLICATION FILED JULY 25, 1907.

3 SHEETS—SHEET 1.

WITNESSES:

INVENTOR.
Peter Steinhauer
BY
ATTORNEY.

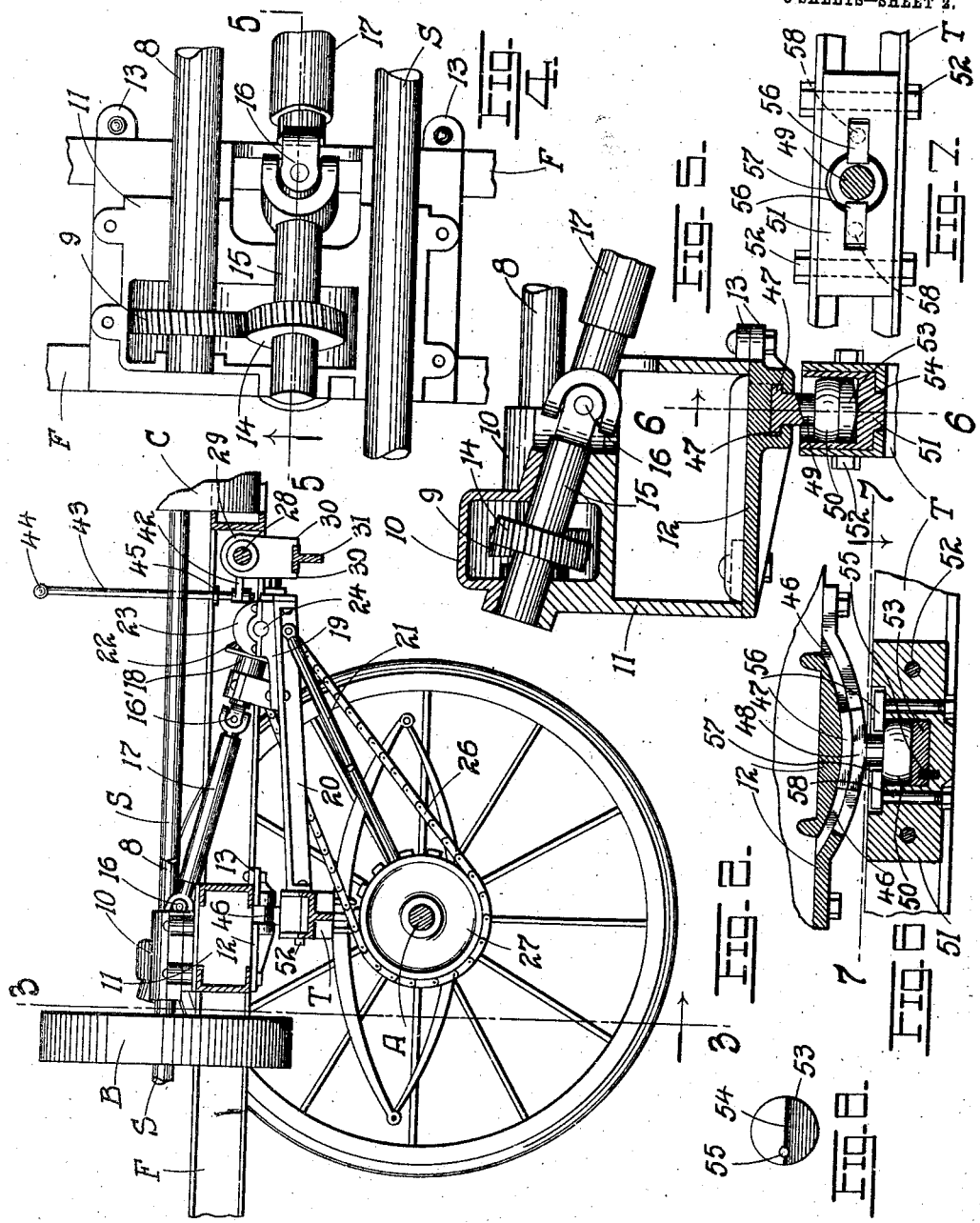

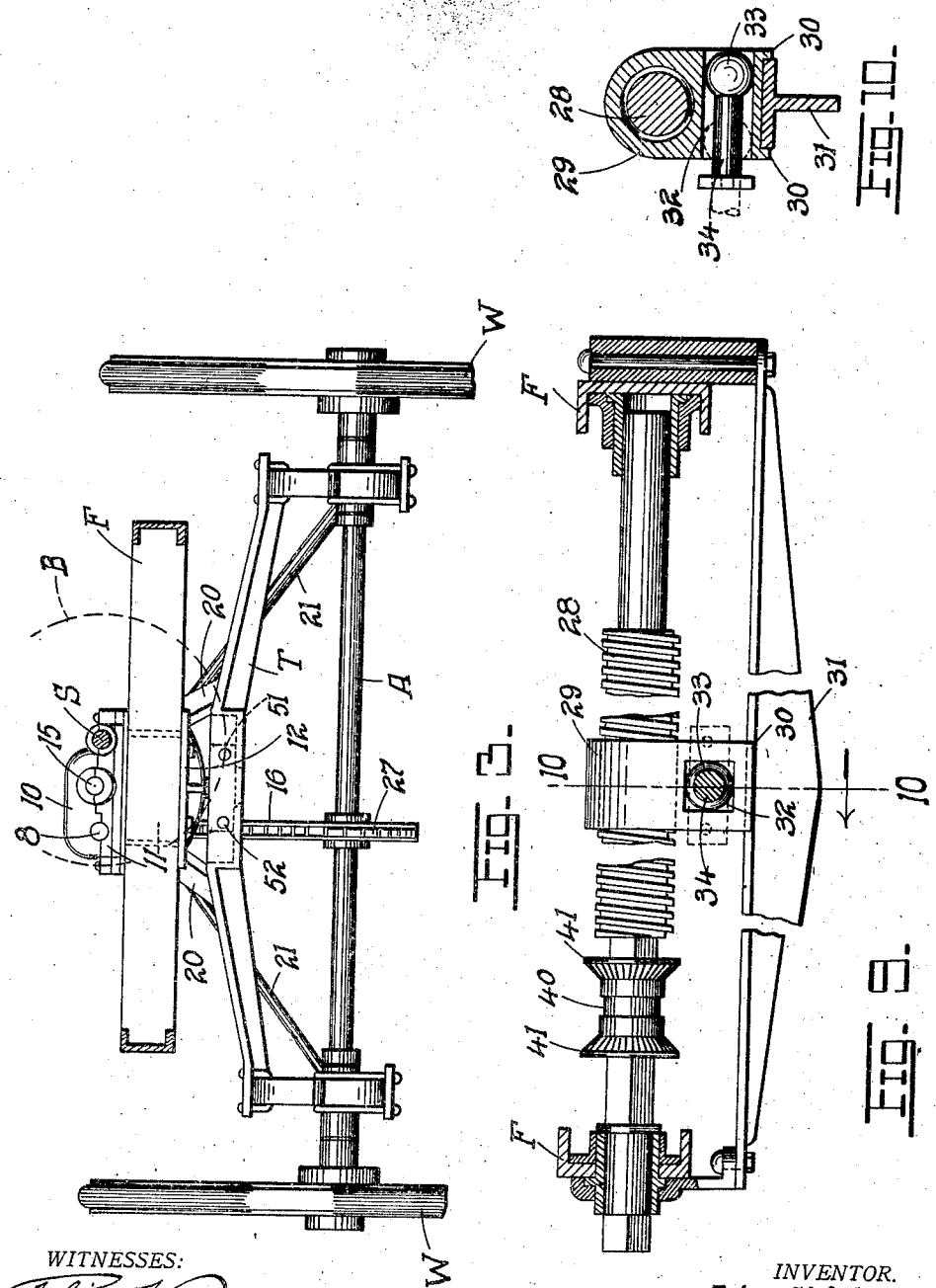

UNITED STATES PATENT OFFICE.

PETER STEINHAUER, OF ST. LOUIS, MISSOURI.

STEERING-GEAR.

No. 874,709.  Specification of Letters Patent.  Patented Dec. 24, 1907.

Application filed July 25, 1907. Serial No. 385,504.

*To all whom it may concern:*

Be it known that I, PETER STEINHAUER, citizen of the United States, residing at St. Louis, State of Missouri, have invented certain new and useful Improvements in Steering-Gear, of which the following is a full, clear, and exact description, reference being had to the accompanying drawings, forming a part hereof.

My invention has relation to improvements in steering-gear for self-propelled vehicles or automobiles; and it consists in the novel construction and arrangement of parts more fully set forth in the specification and pointed out in the claims.

In the drawings, Figure 1 is a plan of the vehicle-frame showing my invention applied thereto; Fig. 2 is a vertical longitudinal section on the line 2—2 of Fig. 1; Fig. 3 is a vertical transverse section on the line 3—3 of Fig. 2; Fig. 4 is an enlarged plan view of the bearing or box for the forward shaft-ends, the cover plate of the bearing being removed; Fig. 5 is a vertical section on line 5—5 of Fig. 4 with cover plate in position; Fig. 6 is a vertical section on line 6—6 of Fig. 5 showing the coupling between the vehicle-frame and front truck; Fig. 7 is a horizontal section on the line 7—7 of Fig. 6; Fig. 8 is a bottom plan view of the fulcrum plate secured to the front truck; Fig. 9 is an enlarged elevational and sectional detail of the screw-shaft; and Fig. 10 is a vertical transverse section taken through the nut on the line 10—10 of Fig. 9.

The object of my invention is to provide a steering-gear for automobiles which will operate freely and with no variation in resistance or friction under any circumstances, the truck to which deflection is imparted being so coupled to the frame of the vehicle and to the steering mechanism that the operation of the latter is in no wise affected by the character of the road or unevenness of surface over which the truck must pass.

A further object is to make special provision for controlling and deflecting the truck by which the steering is accomplished, from the driving gear, with a view of reducing the friction between the parts to a minimum.

A further object is to effect a special connection between the front truck and vehicle-frame, to permit the truck to pass over any kind of a surface, thereby eliminating all jarring and permitting the occupants to ride in ease and comfort.

The advantages of the invention will be better apparent from a detailed description thereof which is as follows:

Referring to the drawings, F, represents the frame of the machine, T, the front oscillating truck, A the axle of the front truck, W, the wheels thereof, and A′ the axle of the rear truck (not shown). The motor shown dotted herein is represented by M, and B, the fly-wheel thereof all of ordinary and well known construction. The motor-shaft S extends rearwardly to the casing C of the transmission gear (which is not here specifically illustrated as it is well known and forms no part of my invention) from which gear leads rearwardly a short shaft 1 terminating in a bevel pinion 2 which meshes with a similar pinion 3 on a rear transverse-shaft 4 carrying a sprocket wheel 5 from which passes a sprocket-chain 6 over a similar sprocket wheel 7 on the rear axle A′, thus imparting rotation to the axle. Leading forward from the transmission gear is a shaft 8 whose front end terminates in a pinion 9 protected by the cover plate 10 of a box or bearing 11 forming part of one of the transverse members of the frame F, the box 11 having secured thereto a plate or casting 12 by means of bolts passed through the lugs 13.

Meshing with the pinion 9 is a pinion 14 on the inclined shaft 15, the latter being coupled by a universal-joint connection 16 to an intermediate transmission shaft 17, which in turn is coupled by a universal-joint 16′ to an inner terminal inclined shaft 18 mounted in a bearing-bracket 19 which is rigidly secured by angle-bars 20 and by rods 21 to the front oscillating truck T, the ends of the rods 21 being looped about the axle A of said truck. The box-bearing 11 serves to support the adjacent ends of the shafts S, 8 and 15 as shown.

The shaft 18 carries a terminal bevel pinion 22 which in turn meshes with a similar pinion 23 on a transverse shaft 24 mounted on the bracket 19, the shaft 24 being provided with a sprocket wheel 25 from which leads forward a sprocket chain 26 over a large sprocket-wheel 27 on the axle A of the front truck T. From the train of mechanism as described, it will be obvious that when the motor-shaft S is rotated, rotation will be imparted not only to the rear axle A′, but to the front axle A, as well.

Mounted transversely across the frame F adjacent to the rear free curved edge of the bracket 19 is a screw-shaft 28 over whose screw-threaded portion is free to travel in either direction a nut 29, which is guided in its reciprocations by the depending flanges 30 thereof loosely embracing the flange of a T-bar 31 coupled to the frame F in any mechanical manner as fully shown in Fig. 9. The details of the connection or mode of fastening are not herein entered into as they are not important. Formed in the body of the nut below the screw-shaft 28 is a chamber 32 elongated transversely to the direction of reciprocation of the nut, said chamber receiving the terminal spherical head 33 of a link or arm 34 secured to the bracket 19. By means of this arrangement, it is perfectly clear that as the nut 29 reciprocates back and forth along the screw-shaft, it will oscillate the link or arm 34 and this in turn will oscillate the parts to which it is secured, namely the bracket 19 and hence the front truck T. When the nut 29 occupies a middle position as shown in full lines in Fig. 1, the axle of the front truck will be parallel to that of the rear truck and the vehicle will travel forward without deflection, that is, to say in a direct line. As the nut shifts to one side of the center it oscillates the front truck in a corresponding direction (see dotted position of truck in Fig. 1), the length of the arm 34 being sufficient to always retain the head 33 in the chamber 32, the spherical form of the head reducing the friction between the parts.

To impart rotation to the screw-shaft I make the following provision: Meshing with the transmission gear in the casing C, is a pinion 35 on a shaft 36, said pinion in turn engaging a pinion 37 on a shaft 38 which terminates in a bevel pinion 39. On the adjacent end of the shaft 28 is slidingly feathered a clutch 40 terminating in bevel pinions 41, 41, and the direction of rotation imparted to the screw-shaft will of course depend on which pinion 41 is forced into engagement with the pinion 39. The shifting of the clutch is accomplished by means of an oscillating arm 42 at the lower end of a rotatable staff 43 controlled by a lever arm or handle 44 within easy reach of the chauffeur, the staff 43 being mounted on a bracket 45 or in any other convenient mechanical manner. By oscillating the handle 44 in proper direction, either one or the other of the pinions 41, 41 will be forced into engagement with the pinion 39, and hence the shaft will rotate in one or the other direction and a corresponding reciprocation will be imparted to the nut 29 and a consequent deflection of the front truck in the direction in which it is intended that the vehicle shall turn.

I will now describe the details by which I mount the frame F on the front truck as it is upon these details that the virtue of the present invention depends: Formed in the casting 12 and disposed transversely to the frame F is a concave groove 46 which receives the flanged portion 47 of the head 48 of a stud 49 serving as a king-bolt or center about which the truck T may oscillate. The stud 49 expands into a rounded head 50 resting loosely in a pocket or cavity of a block 51 at the center of the transverse structural member forming the truck T, (Figs. 5, 6, 7). The block 51 is furthermore secured to the truck-bar by bolts 52. Interposed between the head 50 of the stud 49 and the bottom of the pocket of the block 51 is a fulcrum plate 53 the same being circular in contour to conform to the cylindrical pocket which loosely receives it, the bottom of the plate being formed of two plane faces meeting along a central knife-edge 54, said edge being kept always in a direction parallel to the axle A of the front truck since it is about this edge that the truck is free to oscillate vertically as it passes over the ground traveled by the vehicle. The knife-edge therefore permits the front truck T, whatever may be the horizontal deflection of the latter, to oscillate vertically and thus conform itself to any unevenness in the roadbed or course traveled over, without communicating the effects of such unevenness to the frame and to the occupants of the vehicle. To insure the retention of the knife-edge parallel to the axle A, I provide the plate 53 with a pin 55 which is loosely received by a socket in the bottom of the pocket of the block 51, the pin preventing the fulcrum plate from turning, yet permitting the truck to oscillate about the edge 54, and permitting the plate to rotate about the bearing-head 50 of the stud 49 during the horizontal oscillations of the front truck, the pin 55 virtually coupling the fulcrum plate to the truck which oscillates horizontally about the stud 49 as an axis or center. So that, the front truck is at all times free to oscillate horizontally about the stud 49 as a center in turning corners or deviating from a direct path, and at the same time it is free to oscillate vertically about the knife-edge 54 for reasons above stated.

The structural truck-member T is coupled to the plate 12 and parts identified therewith by means of the plates 56 resting in a depression 57 at the upper edge of the pocket in which are confined the parts 50, 53, said plates overlapping the upper face of the head 50 sufficiently to hold it in place (Figs. 6, 7), the plates being secured in position by the bolts 58 passed through the block 51. It may be stated that the vertical oscillations of the truck T about the knife-edge 54 are only slight, but sufficient to eliminate any jars in passing over rough surfaces.

Having described my invention what I claim is:

1. In a vehicle having a fixed truck and a horizontally oscillating truck, axles on the trucks, means for imparting rotation to the axles for any position of the oscillating truck, and a fulcrum piece for permitting an oscillation of the horizontally oscillating truck, during the travel of the vehicle in a vertical plane disposed transversely to the axle of said truck, substantially as set forth.

2. In a vehicle, a truck rotatable horizontally about a fixed axis, and a fulcrum plate having a knife-edge about which the truck may oscillate in a vertical plane, substantially as set forth.

3. In a vehicle, a body-frame, a stud depending therefrom, a rounded head at the lower end of the stud, a truck having a pocket for the reception of the stud-head, a fulcrum plate interposed between the stud-head and bottom of the pocket, said plate having plane bottom faces meeting in an edge resting on the pocket-bottom, means for maintaining the fulcrum edge in parallel relation to the truck-axle, whereby the truck is capable of horizontal oscillation about the axis of the stud, and of vertical oscillation about the edge of the fulcrum-plate, substantially as set forth.

4. In a vehicle, a body-frame, a stud depending therefrom, a rounded head at the lower end of the stud, a truck having a pocket for the reception of the stud-head, a fulcrum-plate interposed between the stud-head and bottom of the pocket and having a knife-edge resting on said bottom, means for maintaining said knife-edge permanently in parallel relation to the truck-axle, whereby the truck is at all times susceptible of horizontal oscillation about the stud-axis, and of vertical oscillation about the knife-edge, a motor, and intermediate gearing between the motor and truck for imparting rotation to the axle thereof and oscillation about the stud aforesaid, substantially as set forth.

5. In combination with a vehicle body-frame, a truck having a central pocket, a stud projecting from the frame and entering the pocket, a knife-edge fulcrum plate in the pocket supporting said stud, and a locking pin carried by the fulcrum-plate and loosely engaging a socket in the bottom of the pocket for maintaining the knife-edge in permanent relation to the truck-axle, substantially as set forth.

6. In combination with a vehicle body-frame, a truck having a central pocket, a stud projecting from the frame and terminating in a rounded head entering the pocket, a knife-edge fulcrum-plate resting at the bottom of the pocket and supporting the stud-head, and plates for locking the head to the fulcrum-plate, substantially as set forth.

In testimony whereof I affix my signature, in presence of two witnesses.

PETER STEINHAUER.

Witnesses:
EMIL STAREK,
T. EVANS.